April 27, 1926.
P. S. DANNER
1,582,131
METHOD OF RECOVERING A METALLIC HALIDE FROM HYDROCARBON SLUDGES
Filed May 19, 1925
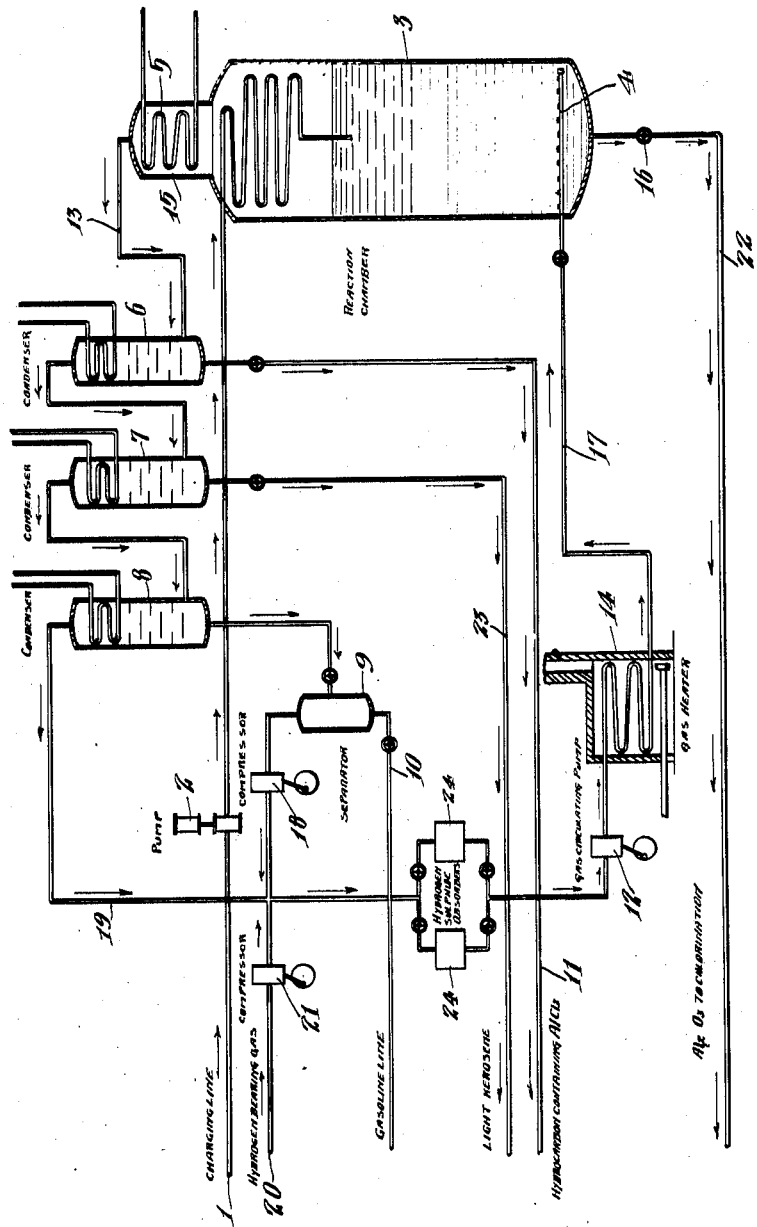
Inventor
Philip S. Danner
By Lyon+Lyon
Attorneys Patented Apr. 27, 1926.

1,582,131

UNITED STATES PATENT OFFICE.

PHILIP S. DANNER, OF POINT RICHMOND, CALIFORNIA, ASSIGNOR TO STANDARD OIL COMPANY, OF SAN FRANCISCO, CALIFORNIA, A CORPORATION OF CALIFORNIA.

METHOD OF RECOVERING A METALLIC HALIDE FROM HYDROCARBON SLUDGES.

Application filed May 19, 1925. Serial No. 31,334.

*To all whom it may concern:*

Be it known that I, PHILIP S. DANNER, a citizen of the United States, residing at Point Richmond, in the county of Contra Costa and State of California, have invented a new and useful Method of Recovering a Metallic Halide from Hydrocarbon Sludges, of which the following is a specification.

This invention relates to a method of recovering a metallic halide from sludges produced during its use in the conversion of petroleum or other heavy hydrocarbons, and an object of the invention is to effect the recovery of aluminum chloride or other metallic halide directly as such so as to economize in the use of the halide and reduce the expense of the recovery.

It will be readily understood that the method of recovery herein set forth will be applicable to the sludges from any operation which involves the treatment of a hydrocarbon material with a metallic halide whether the hydrocarbon be derived from petroleum, from shale, from coal or from any other source. The following process has therefore referred to petroleum hydrocarbons as typical of the group.

The value of metallic halides in promoting certain molecular rearrangements in various hydrocarbon materials is well known and one of the important fields for the advantageous application of this knowledge is the petroleum industry, in which it has become highly desirable to convert large quantities of heavier hydrocarbons into lighter hydrocarbons suitable for fuel in internal combustion motors. The conversion of the heavier hydrocarbons is rapidly and smoothly effected in the presence of a metallic halide such as, for example, aluminum chloride, and the resulting lighter hydrocarbons are of a superior quality to those produced by any other known process.

The exact mechanism by which the metallic halide is able to effect the desired change in the structure of the hydrocarbon molecules is still open to question, but the general reaction is one of true catalysis and in such a case the metallic halide should, in the absence of specific catalyst poisons, retain its activity for an almost indefinite period. In practice, however, this is far from being realized for aluminum chloride is used up so rapidly in any of the methods so far developed that, at the present price of the chloride, its use, though desirable as has been pointed out, is economically impossible.

The factors which combine to quickly render the metallic halide inoperative in the conversion of heavy hydrocarbons are, its reactivity with any water and any oxygen or sulphur compounds contained in the material undergoing treatment, and, during the conversion, the production of considerable amounts of tar and pitch which tend to remove the otherwise active halide from the zone of reaction.

During any probable conversion of heavier hydrocarbon molecules into saturated lighter molecules, the carbon-hydrogen ratio of the lighter products is less than in the original material, and the residue or sludge remaining, after the lighter products are taken off, has an increased ratio of carbon to hydrogen, the ultimate residue being pure carbon.

When the conversion of the heavier hydrocarbon is carried out in the presence of a metallic halide, the rearrangement of the molecules is sufficiently gradual that the heavy residue or sludge passes through the various stages of tar and pitch in its transformation. The molecules of such tar and pitch are chemically highly unsaturated and, hence, offer a great attraction for the molecules of other substances that may be present. Thus, when aluminum chloride or other metallic halide is employed, the molecules of such halide may be attracted and removed from the solution in a combination which is at least partly chemical, though probably to a still greater degree a simple mechanical inclusion. In any event, it has heretofore been practically impossible to prevent the removal of the metallic halide from the hydrocarbon solution in which it is present, and consequently from the field of action.

From the foregoing, it will appear that in order to utilize aluminum chloride or other metallic halide in the method of conversion of hydrocarbons so as to obtain the advantages incident to its use, a simple, efficient and inexpensive method for its recovery is necessary.

Of the many prior methods employed for the recovery of aluminum chloride none is efficient and all are quite expensive and wasteful of raw material. In general, such methods convert the aluminum chloride into an oxide with attendant liberation of chlorine or hydrogen chloride. This, of course, necessitates the re-formation of aluminum chloride. In these prior methods the carbon of the coke is burned either before or after the separation of the aluminum compounds.

The present process is an improvement over the existing methods of recovery in that all of the aluminum chloride, or other metallic halide, present in the sludge is recovered directly as such and in a form to be immediately used for the conversion of further supplies of heavier hydrocarbons. In this method, little or no expensive and corrosive chlorine or hydrogen chloride is produced and the carbon content of the sludge, instead of being burned as low grade fuel or as waste material is largely converted, either directly or indirectly, into lighter hydrocarbon fractions. The increased production of these lighter fractions is a feature that will be especially appreciated in the event of there being a widespread campaign for the conservation of all materials which are directly convertible into fuel for internal combustion motors.

This method is not limited to being performed in any particular form of apparatus, and the accompanying drawing illustrates one form of apparatus that may be used. The view is more or less diagrammatic and the apparatus is shown partly in section.

Referring to the drawings, the method is performed by running the tar, resulting from the operation of any of the accepted methods employing a metallic halide for converting heavier hydrocarbons, while still hot through a charging line 1 in which is a pump 2 for forcing the tar to a reaction or conversion chamber 3. In the event of the production of the tar being intermittent, suitable storage and heating devices will preferably be provided to insure of continuous operation of this apparatus.

In the chamber 3, which may be of any desired form preferably insulated to minimize thermal losses, the tar is in the presence of superheated hydrogen and is subjected to the action of said hydrogen. This hydrogen enters the system from an extraneous source and will be referred to hereinafter as extraneous hydrogen. It is to be understood that the hydrogen may be undiluted or may be diluted with another gas or gases and said hydrogen is introduced to the system through a gas spray nozzle 4 operating to produce small bubbles so as to afford relatively large surface contact between the reactants and, furthermore, operating to effect thorough stirring of the liquid or semiliquid sludge within the reaction chamber. Above all else, the hydrogen bearing gas serves as the means of introducing the necessary energy for raising the sludge to the temperature of reaction.

This operation provides for the bringing of the very highly unsaturated heavy hydrocarbon molecules of the sludge to the temperature of rearrangement by contact, not with a highly superheated metal surface which would effect cracking of such molecules into a relatively light distillate or gas and coke, but with extraneous hydrogen under a condition where said hydrogen has a relatively high degree of reactivity because of being at a relatively high pressure and temperature. Under such conditions the heavy unsaturated molecules of the hydrocarbons are converted by simultaneous cracking and hydrogenation into a light, volatile, largely saturated compound, and the aluminum chloride or other metallic halide contained in the sludge is set free with but slight decomposition.

Positioned in or above the upper end of the chamber 3 is a cooling coil 5 which may employ any suitable cooling fluid. This cooling device 5 controls the temperature at the outlet of the reaction chamber so that aluminum chloride vapors and lighter hydrocarbon vapors will pass from the chamber through a vapor line 13 connected with a dome 15 in which is positioned the cooling device 5, the heavier fractions being condensed by the cooling device 5 and returned to the reaction zone in the chamber 3.

The vapor line 13 carries the vapors to a fractional condenser 6 where the aluminum chloride, or other metallic halide employed, and the hydrocarbons having vapor pressures approximating that of the aluminum chloride, are separated from the lighter vapors by condensation and are discharged into a line 11 by which they may be carried to a suitable chamber, not shown, for further treatment of the aluminum chloride or other metallic halide employed, or they may be returned directly to the primary system from which the sludge was drawn. The latter will usually be preferable. The lighter hydrocarbons pass from the condenser 6 into a condensing and separating system comprising fractional condensers 7, 8 and separator 9.

The vapor temperature at the outlet from the condenser 6 should be such that the smallest possible amount of aluminum chloride is allowed to escape through the vapor line leading from said condenser. The temperature will depend, of course, upon the type of condenser employed and the rate of flow of the fixed gas and will usually be in the neighborhood of 150° C. This particular temperature may be highly desirable because, when it is maintained the hydrocarbons which pass over at such temperature are condensible into gasoline and they require no further fractionation or distillation. The gasoline discharges from the separator 9 to storage through a line 10. In some instances, it may be desired to operate the condenser 6 so that the temperature of the vapor discharging therefrom will be at a temperature as high as 165° to 180° C., in which event the fractional condenser 7 is useful in separating the light kerosene fraction, which discharges through a line 23.

It will usually be found desirable to release the pressure on the gasoline before it enters the separator 9, in order to secure more complete release of the hydrogen and other hydrogen bearing gases which may be returned to the reaction zone in 3. A compressor 18 is shown for use in bringing those gases back to the pressure of the system. In some cases it may be possible to discharge such gases directly into line 20. When the volume of liquid being discharged through lines 11 and 23 becomes considerable it will likewise be desirable to include a separator similar to 9 for the recovery of the dissolved gases.

Fixed gases are also drawn from the condenser 8 through a line 19 which connects with the line 17. Also connected with the line 17 is a hydrogen feed line 20 in which is a compressor 21, and it is through this line that fresh extraneous hydrogen is inducted into the system to replace that combining with some of the carbon molecules to produce the saturated lighter fractions referred to above.

A circulating pump is provided at 12 to collect the hydrogen bearing gases from the various sources already mentioned and force them through a suitable heater 14 and thence to the spray nozzles 4, previously referred to, by way of line 17.

In the line 17, between the pump 12 and compressor 18, is a hydrogen sulphide absorber or absorbers 24 which remove any hydrogen sulphide from the gases before the gases are inducted into the reaction chamber.

Any aluminum oxide or other solid materials carried by the tar from the aluminum chloride treaters, not shown, mentioned above, is liberated during the reaction in the chamber 3 and settles to the bottom thereof and may be drawn off as desired into a line 22 through a valve 16 on said line.

The conditions of operation will depend largerly upon the nature of the tar treated. When such tar is removed from the aluminum chloride treaters soon after formation, the pressure and temperature required will be materially less than when the tar is permitted to remain for a longer period of time so that the reaction is advanced further and decomposition of the tar results to a degree that nearly produces coke. The temperature of the reaction mass will be, in most cases, between 350° C. and 500° C., and the pressure may be as high as 200 atmospheres or even higher.

It is to be understood that the incoming gases must be preheated sufficiently so that they carry sufficient thermal energy to balance radiation losses in the reaction chamber and so as to furnish the energy of reaction and evaporation. It is, in fact, preferable to introduce the gases at the highest temperature consistent with the safe operation of the apparatus since the reactivity of said gases increases very rapidly with the increase of temperature.

It is theoretically possible for aluminum chloride to be reduced, while thus in the presence of hydrogen at high pressure and temperature, in accordance with either of the following equations:—

$$Al_2Cl_6 + 6H_2 = 2AlH_3 + 6HCl$$

or $$Al_2Cl_6 + 3H_2 = 2Al + 6HCl$$

I have found, however, that under the usual operating conditions such reduction of the aluminum chloride takes place only to a limited extent.

The method described above is continuous and, in fact, the operation of the method may be for indefinite periods of time, such periods being dependent only upon the desirability of frequently inspecting the high pressure apparatus for defects that may develop and make it dangerous to operate.

The aluminum chloride contained in the sludges is reclaimed directly by the method outlined above and its active life is determined only by the amount of water and of oxygen and sulphur compounds present in the original charging material, and I have found that its life may be as much as twenty times longer than when it is used under the conditions present in the practice of the prior known methods. It will be noted that the recovery of the metallic halide is accomplished in such a way as to simultaneously produce considerable quantities of gasoline which, under normal conditions, will be sufficient to more than pay for the expense of performing the method by which the recovery is effected. It will also be noted that no expensive and corrosive chlorine or hydrogen chloride is involved, potential motor fuel is conserved, and the method is continuous and requires extremely little supervision.

I claim:

1. The method of reclaiming a metallic halide from the sludges produced during its use in the conversion of hydrocarbons, which consists in the simultaneous cracking and hydrogenation of the highly unsaturated heavier hydrocarbons in these sludges, whereby lighter saturated hydrocarbons are produced, and the metallic halide is set free for further use in the treatment of new supplies of petroleum hydrocarbons.

2. The method of reclaiming a metallic halide from the sludges produced during its use in the conversion of petroleum or other heavy hydrocarbons, which consists in heating hydrogen gas, and bringing the highly unsaturated heavier hydrocarbons contained in the sludge into intimate contact with the heated gas.

3. The method of reclaiming a metallic halide from the sludges produced during its use in the conversion of hydrocarbons, which consists in subjecting hydrogen gas to heat and pressure, and exposing the mixture of highly unsaturated heavier hydrocarbons and metallic halide comprising the sludge to the action of the heated hydrogen gas while said gas is under pressure.

Signed at Richmond, California, this 6th day of May, 1925.

PHILIP S. DANNER.